United States Patent [19]

Chida et al.

[11] 4,349,287

[45] Sep. 14, 1982

[54] INTERMITTENT PAPER FEED MECHANISM

[75] Inventors: Yoshinori Chida; Satoru Tada, both of Tokyo, Japan

[73] Assignee: Seikosha Co., Ltd., Japan

[21] Appl. No.: 218,185

[22] Filed: Dec. 19, 1980

[51] Int. Cl.³ .......................... B41J 19/78; F16H 27/02

[52] U.S. Cl. .......................... 400/569; 400/571; 400/577; 226/157; 74/126

[58] Field of Search .................... 74/25, 126; 226/157; 400/569, 571, 572, 573, 573.1, 577

[56] References Cited

U.S. PATENT DOCUMENTS

| | | | |
|---|---|---|---|
| 3,138,961 | 6/1964 | Busch | 74/126 |
| 3,422,941 | 1/1969 | Fredell | 74/126 |
| 4,050,569 | 9/1977 | Crump et al. | 400/569 X |

*Primary Examiner*—Paul T. Sewell
*Assistant Examiner*—Daniel J. Roock
*Attorney, Agent, or Firm*—Robert E. Burns; Emmanuel J. Lobato; Bruce L. Adams

[57] ABSTRACT

An intermittent paper feed mechanism comprises a driving wheel rotationally driven in an intermittent manner, a driven wheel disposed opposite to and rotated by the driving wheel, a stopper means for restricting the angle of rotation of the driving wheel and a coiled return spring for biasing the driving wheel in a direction opposite to its rotational driven direction. The driving and driven wheels, the stopper means and the return spring are coaxially mounted on a common shaft. The device of the invention enables a paper on which characters are printed by a printing head to be advanced at a high accuracy in an intermittent manner without using a stepping pulse motor.

8 Claims, 6 Drawing Figures

INTERMITTENT PAPER FEED MECHANISM

BACKGROUND OF THE INVENTION

The present invention relates to an intermittent paper feed mechanism which is adapted to be employed to advance a paper to be printed by a printing apparatus.

In the conventional paper feed device for a printing apparatus, a stepping pulse motor is generally employed. The rotational angle of advance of the stepping pulse motor can be controlled by means of a pulse control thereby enabling the device to feed the paper with accuracy in an intermittent manner. This conventional device, however, is disadvantageous due to its relatively high cost of manufacture.

SUMMARY OF THE INVENTION

It is, therefore, a principal object of the present invention to provide an intermittent paper feed mechanism for a printing apparatus which can be manufactured at a low cost which can advance a paper with accuracy.

Another object of the invention is to provide such an intermittent paper feed mechanism for a printing apparatus which can be assembled easily.

BRIEF DESCRIPTION OF THE DRAWINGS

Other objects, features and advantages will be appearent from the following description and the accompanying drawings in which.

DETAILED DESCRIPTION OF THE INVENTION

An embodiment of the intermittent paper feed mechanism constructed in accordance with the invention will be described hereinafter with reference to the accompanying drawings.

Figure 1:
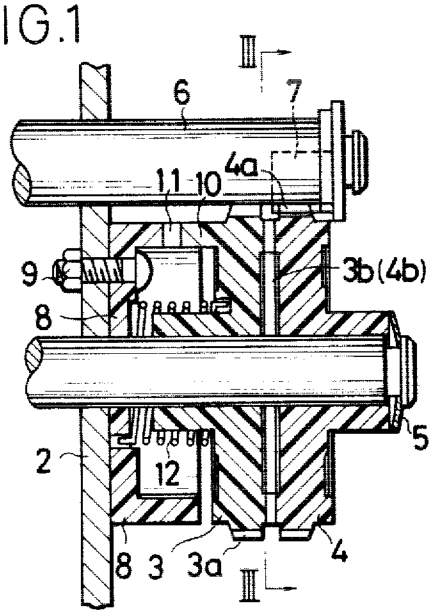
FIG. 1 is a cross sectional view of a first embodiment of an intermittent paper feed mechanism according to the present invention.
Figure 2:
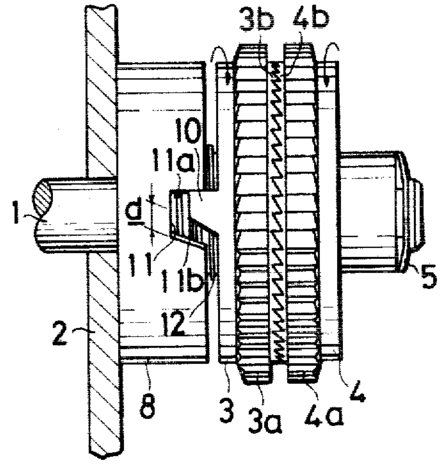
FIG. 2 is a top plan view of the first embodiment in which the click means is removed.
Figure 3:
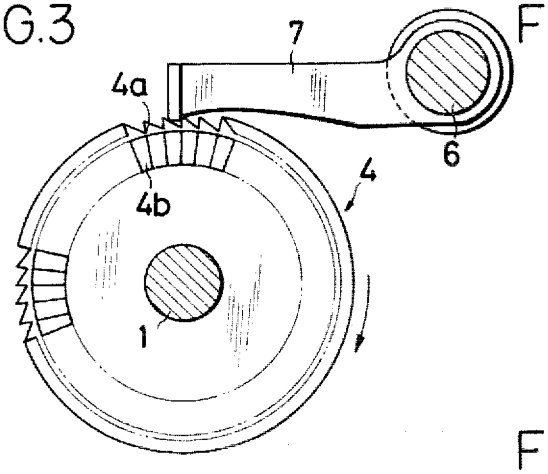
FIG. 3 is a cross sectional view taken along the line III—III of FIG. 1.

As shown in FIGS. 1 and 2, a rotary shaft 1 for driving sprocket wheels (not shown) meshable with perforations of a paper (not shown) printed by a printing apparatus (not shown) is rotatably supported by a support plate 2. The shaft 1 carries thereon a driving member or wheel 3 rotatably supported thereby. The driving wheel 3 is provided on the outer periphery thereof with a plurality of saw-shaped teeth 3*a*, and is adapted to be actuated intermittently by means of a plunger (not shown). A driven member or wheel 4 is carried on the shaft 1 in opposed relation with respect to the driving wheel 3, and is secured thereto to rotate together with the shaft 1. The driven wheel 4 is mounted on the shaft 1 by means of a retaining snap ring 5 which is mounted on the end of shaft 1. The driven wheel 4 is provided on the outer periphery thereof with preventing means in the form of a plurality of saw-shaped teeth 4*a* cooperatable with a click lever 7 which is rotatably supported by a shaft 6, as shown in FIG. 3, such that reverse rotation of the driven wheel 4 is effectively prevented. The click lever 7 is biased counterclockwise about the shaft 6 by means of a spring (not shown). In addition, the driving and driven wheels 3 and 4 have complementary saw-shaped teeth 3*b* and 4*b* formed integrally from the respective opposite surfaces thereof and meshable with each other. By such a construction, when the driving wheel 3 makes a revolution in the arrowed direction of FIG. 3, the driven wheel 4 can be interlocked therewith and can be rotated step by step in the arrowed direction.

Figure 4:
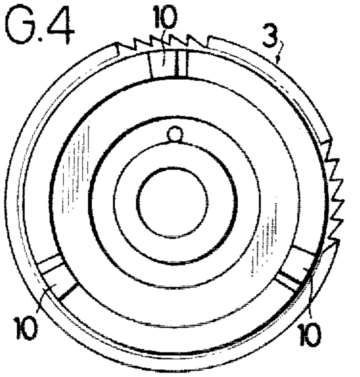
FIG. 4 is a left side view of a driving wheel incorporated in the first embodiment.
Figure 5:
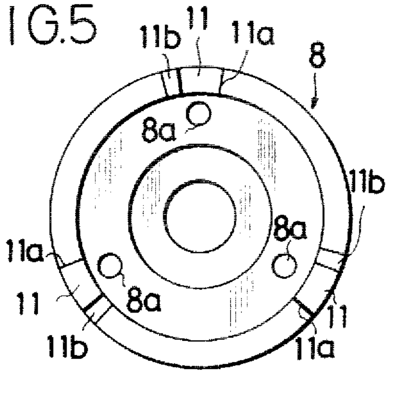
FIG. 5 is a right side view of a stopper body incorporated in the first embodiment and, FIG. 6 is an exploded front elevational view showing the driving and driven wheels incorporated in a second embodiment of the intermittent paper feed mechanism of the invention.

As shown in FIGS. 1 and 2, a cylindrical stopper body 8 having an open right end is disposed between the support plate 2 and the driving wheel 3, and is fixed on the support plate 2 by means of screws 9 (on of which is seen in FIG. 1) passing through the bottom thereof. The driving wheel 3 has a plurality (three in this embodiment) of circumferentially spaced-apart projections 10 formed integrally therewith and extending toward the stopper body 8 and positioned in a coaxial circle as shown in FIG. 4. The body 8 has a cylindrical wall in which are provided circumferentially spaced-apart notches 11 configured to receive respective ones of the projections 10. As shown in FIGS. 2 and 5, each of the notches 11 has a trapezoid shape of which an edge 11*a* extends at a right angle and of which another spaced edge 11*b* is inclined with respect to a line normal to the axis of rotation of the shaft 1. Each of the projections 10 too has a trapezoid shape substantially corresponding to that of the notches 11, though has a width narrower than that of the notches 11. The driving wheel 3 is biased in a direction of rotation by means of a coiled return spring 12, so that the perpendicular edges of the projections 10 are in contact with the perpendicular edges 11*a* of the notches 11. By such a construction, there are provided respective gaps or clearances of a distance d between the inclined edges of the projections 10 and the notches 11, and this clearance d corresponds to one pitch of the teeth 3*a*, 4*b* of the wheels 3, 4. The return spring 12 is disposed between the driving wheel 3 and the stopper body 8, and is wound around the sleeve portion of the driving wheel 3. The opposite ends of the return spring 12 are secured to the driving wheel 3 and to the stopper body 8 respectively. The driving wheel 3 is also urged toward the driven wheel 4 by virtue of the biasing force of the return spring 12, in addition to being biased in a direction opposite to the direction of rotation of driving.

The operation of this embodiment of the invention will be described below.

When the driving wheel 3 is activated in the arrowed direction against the force of the spring 12 in FIG. 2 by means of a plunger (not shown) the driven wheel 4 is interlocked with the driving wheel 3 so as to be rotated therewith in the same direction, i.e. in the arrowed direction. When the driving wheel 3 drives the driven wheel 4 just one pitch, the projections 10 engage with the stationary inclined edges 11*b* of the notches 11 thereby preventing further advance of the wheels 3 and 4 beyond a rotational distance corresponding to one pitch.

Thus the driving wheel 3 ceases rotational motion as soon as the projections 10 contact the inclined edges 11*b*, then the driving wheel 3 becomes pressed strongly toward the driven wheel 4 due to the inclined edges of the projections 10 and the notches 11 in addition to the pressing force of the return spring 12. Therefore the teeth 3*a*, 4*a* of the wheels 3, 4 are adapted to mesh with each other correctly, and the driven wheel 4 is stepped only one pitch. Thus the shaft 1 also is rotated as a result of rotation of the driven wheel 4 and the paper is advanced by sprocket wheels (not shown) carried on the shaft 1. Thereafter, the plunger is reset so that the active motion of the driving wheel 3 is released. Then, the driving wheel 3 is returned to its initial position by means of the return spring 12, while the driven wheel 4 remains in its rotationally advanced position because reverse rotation thereof is prevented by the click lever 7 engaging with the teeth 3*a* as shown in FIG. 3. Moreover, the teeth 3*b* ride over the teeth 4*b* against the pressing force of the return spring 12, so that the driving wheel 3 is moved leftwardly along the axis thereof, during the return action thereof.

Figure 6:
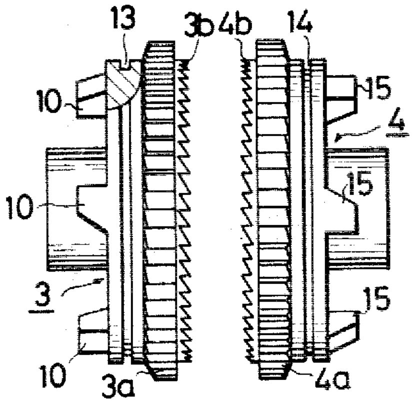

The numbers and/or shapes of the projections 10 and the notches 11 can be modified without departing from the spirit and the scope of the invention. Further, the driving and driven wheels 3 and 4 also can be formed into the same and/or symmetric shape respectively, for example, as shown in FIG. 6. In this second embodiment, the driving wheel 3 has a peripheral groove 13 in addition to the dummy teeth 3*a*, and teeth 3*b* and the projection 10, and the driven wheel 4 has a peripheral groove 14 and dummy projections 15 corresponding to those of the driving wheel 3 in addition to the teeth 4*a*, 4*b*. The groove 13 of the driving wheel 4 is for winding a driving rope (not shown) which is pulled in and out through the plunger. Although the groove 14 and the dummy projections 15 are useless for the driven wheel 4, and the dummy teeth 3*a* are useless for the driving wheel 3, such a configuration enables both of the wheels 3 and 4 to be identical with each other thereby enabling use of a sole metal mold for the injection molding of both wheels.

As described above, the provision of the invention enables the intermittent paper feed mechanism to advance the paper to be printed by the printing head at a high accuracy in an intermittent manner without need of using a stepping pulse motor, and it can be produced at a low cost. In addition, since the driving and driven wheels and the stopper body are adapted to be arranged coaxially with one another, it is possible to assemble them easily, and the overall size of the mechanism can be reduced.

What we claim is:

1. An intermittent feed mechanism comprising: an output shaft rotatably supported by a support plate to undergo rotation about a rotary axis; a driven wheel carried with said shaft so as to rotate together therewith; a driving wheel rotatably and slidably received on said shaft so as to be positioned opposite to and facing said driven wheel, said driving and driven wheels having on their respective facing surfaces thereof a plurality of axially extending ratchet teeth releasably engageable to effect one-way coupling of the driving and driven wheels in a forward direction of rotation, and said driving wheel having a plurality of projections integrally extending from a lateral surface thereof, each projection having a trapezoid shape having one edge extending at a right angle and another edge inclined with respect to a line normal to the rotary axis; a cylindrical stopper body fixed on said support plate opposite to said driving wheel and having a cylindrical wall portion having spaced therearound a plurality of notches corresponding in number and similar in shape to said projections, said projections being movably inserted in respective ones of said notches and coacting therewith to ensure incremental rotation of the driving wheel through increments corresponding to one pitch of said ratchet teeth of said driving wheel; a coiled return spring disposed between said driving wheel and said stopper body for pressing said driving wheel toward said driven wheel, the opposite ends of said return spring being respectively connected to said stopper body and said driving wheel for imparting a return force of rotation to said driving wheel in the reverse direction of rotation; and a rotatable detent lever cooperative with a plurality of pawls disposed on the outer peripheral surface of said driven wheel so as to prevent reverse rotation of said driven wheel in the reverse direction; whereby during operation the driving wheel is intermittently advanced in the forward direction through increments corresponding to one pitch of said ratchet teeth thereof through the coaction between said projections and said notches, and said driving wheel is axially urged toward said driven wheel so as to enable said ratchet teeth of said both wheels to engage each other during forward advance of the driving wheel.

2. An intermittent feed mechanism as claimed in claim 1; in which said driving wheel has a plurality of dummy pawls which correspond to said pawls of said driven wheel, and said driven wheel has a plurality of dummy projections which correspond to said projections of said driving wheel, whereby said both wheels have the same shape and can be produced by using a common mold.

3. An intermittent feed mechanism comprising: a rotatable shaft mounted to undergo rotation about a given axis of rotation; a driven member connected to said shaft for rotation therewith; a driving member mounted to undergo forward and reverse angular displacement and being disposed opposite to and facing said driven member; means for ensuring angular displacement of the driving member through precise angular increments comprising a plurality of circumferentially spaced projections of predetermined shape projecting outwardly from said driving member, and a stationary stopper member disposed adjacent said driving member and having circumferentially spaced notches each defined by a pair of spaced surface portions, the notches being similar in shape to though larger in size than the projections, said driving and stopper members being positioned such that each of the driving member projections extends into one of the stopper member notches between one pair of spaced surface portions to thereby restrict angular displacement of the driving member through angular increments corresponding to the angular clearance between the projections and the respective pairs of notch surface portions; biasing means for biasing the driving member in the direction of reverse angular displacement to position the driving member in one extreme angular position in which the driving member projections abut one of the pair of spaced notch surface portions; coupling means for unidirectionally coupling the driving member to the driven member during forward angular displacement of the driving member during which the driving member is angularly displaced to its other extreme angular position in which the driving member projections abut the other of the pair of spaced notch surface portions; and preventing means for preventing reverse angular displacement of the driven member.

4. An intermittent feed mechanism according to claim 3; wherein the driving member is mounted on said shaft to undergo sliding movement therealong and rotational movement relative thereto; the coupling means comprises sets of axially extending ratchet teeth on both the driving and driven members engageable with each other when the driving member is axially displaced on the shaft in one direction to thereby unidirectionally couple the driving member to the driven member; and urging means for axially urging the driving member in the one direction.

5. An intermittent feed mechanism according to claim 4; wherein the biasing means and urging means comprise a single coiled spring.

6. An intermittent feed mechanism according to claim 3 or 4; wherein the shaft, driving member, driven member and stopper member are all coaxially mounted relative to the axis of rotation of the shaft.

7. An intermittent feed mechanism according to claim 3 or 4; wherein the predetermined shape of the projections and notches comprises a trapezoid shape.

8. An intermittent feed mechanism according to claim 3 or 4; wherein the driving member is mounted on said shaft to undergo sliding movement therealong and rotational movement relative thereto; and wherein each of said other surface portions of each pair of spaced notch surface portions, and the corresponding portion of each driving member projection, are inclined relative to the given axis of rotation of the shaft so that the inclined portions of the driving member projections abut the inclined surface portions of the notches at the final stage of forward angular displacement of the driving member.

* * * * *